United States Patent [19]
Martin et al.
[11] 3,916,311
[45] Oct. 28, 1975

[54] RADIO FREQUENCY COMMUNICATION SYSTEMS

[75] Inventors: David James Reginald Martin, Tamworth; Quintin Visser Davis, Ashtead, both of England

[73] Assignee: Coal Industry (Patents) Limited, London, England

[22] Filed: Apr. 30, 1973

[21] Appl. No.: 355,755

[30] Foreign Application Priority Data

May 9, 1972 United Kingdom .............. 21619/72

[52] U.S. Cl. ........................ 325/4; 325/53
[51] Int. Cl.[2] ........................ H04B 7/24
[58] Field of Search ........... 325/1, 3, 12, 23, 53, 54, 325/51, 52, 144, 159, 4, 62; 179/82, 15 AL; 246/3, 5, 8, 3 D

[56] References Cited

UNITED STATES PATENTS

| | | | |
|---|---|---|---|
| 2,649,540 | 8/1953 | Homrighous | 325/4 |
| 2,980,793 | 4/1961 | Daniel | 179/82 |
| 3,458,661 | 7/1969 | Forde et al. | 179/15 AL |
| 3,629,707 | 12/1971 | Baba et al. | 325/53 |

FOREIGN PATENTS OR APPLICATIONS

| | | | |
|---|---|---|---|
| 1,248,223 | 9/1971 | United Kingdom | 325/51 |
| 1,248,222 | 9/1971 | United Kingdom | 325/51 |
| 1,239,231 | 7/1971 | United Kingdom | 325/51 |

*Primary Examiner*—Benedict V. Safourek
*Assistant Examiner*—Jin F. Ng
*Attorney, Agent, or Firm*—James C. Wray

[57] ABSTRACT

A radio communication system suitable for use in tunnels and mines uses a leaky radiating transmission line connected between a transmitter and a receiver to transmit radio frequency signals to a local receiver. Unidirectional repeaters are located in the transmission line and a return path is provided by a normal wire carrying demodulated signals from the receiver to the transmitter.

5 Claims, 2 Drawing Figures

RADIO FREQUENCY COMMUNICATION SYSTEMS

This invention relates to radio frequency communication systems and is particularly concerned with systems operating over a long radiating or leaky transmission line.

Radiating or leaky transmission-line systems basically comprise a base transmitter which has a radio-frequency transmission line extending from it along which radio frequency signals are sent. Such systems are described for example in British Patent Specification Nos. 1,248,222, 1,248,223 and 1,239,231. The transmission line is deliberately constructed as an imperfect one, such as a coaxial cable with a perforate outer conductor, so that signals in the inner conductor can set up electromagnetic fields outwardly of the line and can be picked up by mobile receivers in the vicinity of the line.

Many forms of transmission line have been proposed. In particular, a coaxial line having a braided outer conductor in which the braid is loosely wound so as to give a poor screening effect has been used. Proposals have also been made in British Patent Specification No. 1,235,888 to provide a coaxial cable with a foil outer conductor in which the foil has holes or slits cut in it along its length. A variation on this where a directional propagation of the radiated signals is required has been provided by forming the outer conductor with a longitudinally extending slot so that the signals can 'balloon' out of the slot on one side only. The type of transmission line cable to be used is not limited to the coaxial type and a twin wire or ribbon type in which two parallel spaced wires are embedded in a dielectric has been used.

A frequency range conveniently used in such transmission systems is one of between 25 and 500 MHz. The mobile receivers in the system are also associated with transmitters to form mobile stations so that two way communication with the base station or between two mobile stations can be set up. It is usually required that signals may be passed in the two directions of communication simultaneously so that the base station may be used as a relay to retransmit signals received from a mobile station to another mobile station or stations, or alternatively to transmit a signal indicating to other mobile stations that the system is engaged. In such cases any repeater in the cable must be capable of amplifying signals in two directions simultaneously; this requires that the repeater must comprise separate amplifying paths in the two directions, and that different frequencies be used in the two directions of communication so that the signals may be suitably separated and routed through the appropriate paths by means of electrical filters. It will be appreciated that the filters and the need for simultaneous amplifying paths in opposite directions and the need to maintain electrical stability contribute a substantial part to the cost of the repeater and the overall transmission system.

Previous systems have also been used and described in which the range of a simple system is extended as required by employing multiple base stations suitably deployed so as to provide between them the whole of the required coverage. Such base stations are controlled simultaneously either over the transmission line itself or through the medium of special lines provided for the purpose.

All such extended systems have disadvantages of complexity and cost of the apparatus involved, due largely to the necessity for considering the simultaneous transmission, amplification and reception of signals passing in opposite directions within the transmission line.

It is an object of the present invention to provide a system which mitigates or substantially overcomes these disadvantages.

According to the present invention a radio frequency communication system includes a transmitter joined to a radiating transmission line, the transmission line including a unidirectional repeater, or a plurality of unidirectional repeaters, at least one mobile station including a receiver arranged to receive signals radiated from the line, and a receiver connected to or near the remote end of the line for demodulating signals received from a or the mobile stations.

The receiver connected to the end of the transmission line is, in one form of the invention, connected by a separate link or control line directly back to the transmitter, the link line acting as a return path for all signals. The link line can carry the signals in audio-frequency form and can, therefore, be a simple telephone-type pair of wires needing no filters or repeaters along its length.

The transmitter may be arranged to transmit at one radio frequency and the mobile stations may incorporate local transmitters arranged to radiate signals back to the line on a second different radio frequency. In such an arrangement the repeaters are designed to operate over a band width sufficient to cover all frequencies used.

If a plurality of areas off the line of the main transmission line are to be served, branch lines off the said transmission line may be provided. Dependent on the length of these lines one or more repeaters may be included along their length. These branches may either each terminate in their own receivers which are looped together and share a common link or control line back to the transmitter, or may be connected directly to the receiver at the end of the main transmission line.

In order that the invention may be properly understood two examples of a communication system in accordance therewith will now be described with reference to the two figures of the accompanying drawings. These figures show the schematic layout of the systems. In these examples it is assumed that the system is applied to a coal mine where communication has to be made between a base station and a number of points along a tunnel leading to a coal face.

Figure 1:
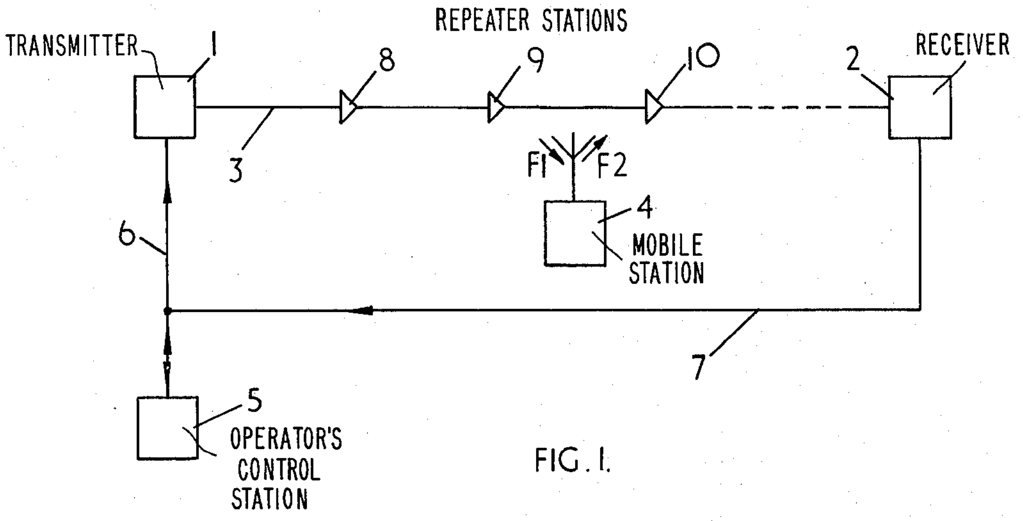
FIG. 1 is a schematic representation of a communication system.

Referring now to FIG. 1 of the drawings, the system comprises a transmitter 1 which is connected to a receiver 2 by a leaky coaxial transmission line 3. The line 3 is of the type having a loosely wound outer conductor and signals passing along the line radiate outwardly of it through the loose outer conductor. The line 3 is installed in the tunnel and the radiating effect of the line is sufficient for the signals to be picked up by a mobile receiver, such as the mobile station 4, situated anywhere in the tunnel. The transmitter 1 is controlled by an operator's control station 5 through a cable 6. The receiver 2 is connected to the cable 6, and hence to the transmitter 1 by a link or control line 7 which may be a simple and inexpensive telephone-type line since signals over this path are being conveyed in audio-frequency form.

The mobile station 4 includes not only a receiver for picking up signals radiated from the line 3, but also a transmitter for transmitting signals, at a different frequency to those received, to the line 3. A plurality of repeater stations 8, 9, 10 are included at intervals along the line 3, their number depending on the length of the line and the rate of loss of signal power along it. Each repeater is unidirectional and only allows radio-frequency signals to pass through it in one direction, i.e., from transmitter 1 to receiver 2, and signals in the opposite direction being blocked or not amplified. The repeater may also include filter circuitry to ensure only signals in a specified band width are passed; in this example the pass-band must include 72 and 85 MHz.

The repeaters 8, 9, 10 act effectively as amplifiers and as such require power on which to operate. This power is kept to a low level to allow it to be supplied over the transmission line 3. Similarly the power consumption of the receiver 2 is preferably low since it too may then advantageously draw its power over line 3.

In some cases it may be convenient for the control station 5 to be combined with either the transmitter 1 or the receiver 2; in other cases it may be some distance away, such as on the surface of a mine for an underground mine system.

In operation the operator at the control station 5 sends signals over line 6 to the transmitter 1, which transmits the signals at a first radio frequency *f*1, in this example 72 MHz, to the receiver 2 along the line 3. The signals are radiated from the line 3 along its length and amplified at each of the repeaters 8, 9, 10. Any mobile station 4 which has its receiver switched on and tuned to the frequency *f*1 picks up the signals and converts them into audible speech signals. The operator of the mobile station 4 can reply to any message received by operating the transmitter of the mobile stations. This transmitter converts audio-frequency signals into radio-frequency signals at a second frequency *f*2, in this example 85 MHz, which are radiated by the station 4 and picked up in the line 3. The signals at *f*2 can only travel usefully along the line in a direction towards the receiver 2 since any travel in the reverse direction is blocked by the first unidirectional repeater the signal reaches. When the signal *f*2 reaches receiver 2 it is transmitted back along the control line 7 to the control station 5, where it is converted into audio-frequency signals.

In any arrangement as described in which the frequencies *f*1 and *f*2 are sufficiently far removed from one another, it is possible to arrange for the system to operate in 'talk-through' mode, in which the audio-frequency output signals from the receiver 2 are fed back via the control line 7 to the transmitter 1 so re-transmitting on frequency *f*1 all signals received on frequency *f*2. This allows direct two-way communication between mobile stations 4, receiver 2 and transmitter 1 with the repeaters 8, 9, 10 serving as a relay system. Alternatively, *f*1 and *f*2 may be identical, in which case the receiver 2 and the repeaters 8, 9, 10 can be simplified in design, but the transmitter 1 and receiver 2 may then not operate simultaneously and talk-through operation is not possible.

The drawing relates to a simple tunnel where the region concerned can be served by a single transmission line extending directly from the transmitter 1 to the receiver 2. In many cases it is required to serve two or more parallel or branching tunnels, in which case single transmitters and receivers are still adequate but the line 3 has to divide on leaving the transmitter 1 and recombine at the receiver 2 after taking separate paths with separate chains of repeaters in each path.

Figure 2:
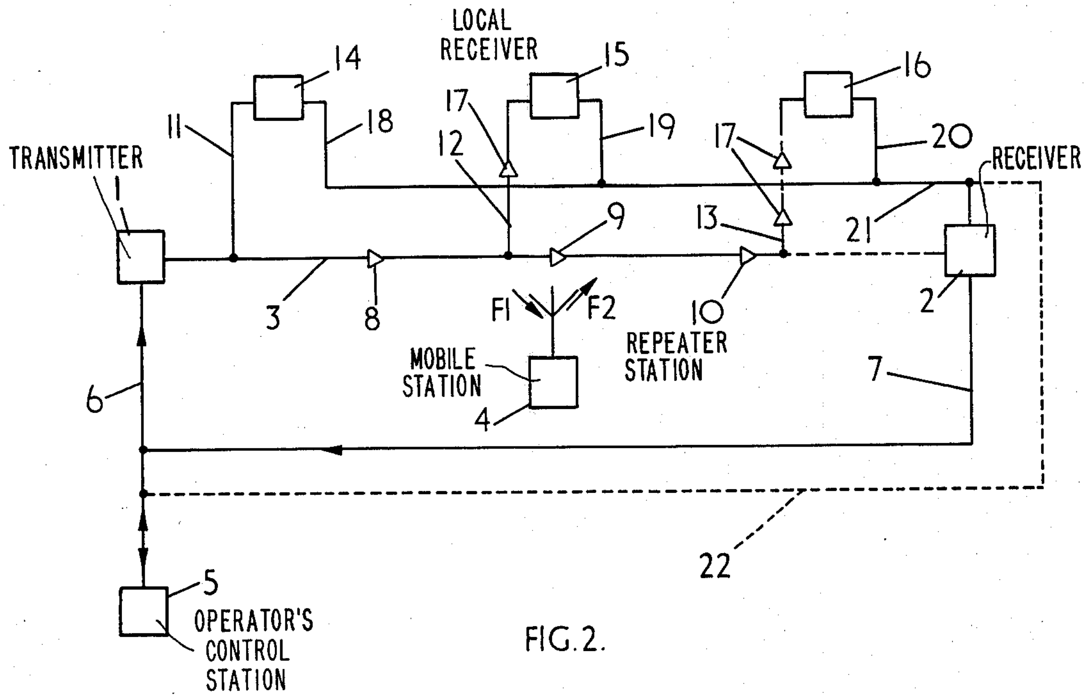
FIG. 2 is a schematic representation of a communication system having three branches.

In a case where a tunnel is branched or divided without convenient subsequent recombination, it would be necessary and practicable, as shown in FIG. 2, to which reference is now made, to terminate each branch with a separate receiver.

Three such branches 11, 12 and 13 are shown in FIG. 2. The first of these is only a short branch and terminates in a local receiver 14 without any repeater being necessary in the line. The branches 12 and 13 are each longer and terminate in respective receivers 15, 16. Each of these branches contains at least one repeater such as 17. The local receivers 14, 15, 16 each connect to a common link or control line 21 through local lines 18, 19, 20. The common control line can connect with the receiver 2 and hence the line 7, or alternatively can be extended as shown at 22, to join with the transmitter 1. If suitable, lines 18, 19 and 20 can connect through line 3 itself. If a branch from the main transmission line were short, for example less than 500 metres in length, it would be adequate not to terminate that branch with a separate receiver but to rely on the signals received on that branch being conducted back to the main transmission line and thence joining the general flow of signals.

In the event of two or more separate radio communication facilities employing different frequencies being required to serve the same tunnel, it would be possible for all such facilities to share the same transmission line 3 and the same chain or chains of repeaters 8, 9, 10 providing the repeaters were suitably designed to accommodate all the frequencies used.

In some applications of the invention, for example to a pair of parallel tunnels, roads or railway tracks, it is an advantage to co-site the transmitter 1 and receiver 2 with the transmission line 3 and its periodic repeaters forming a closed loop between them, thus dispensing with the control line between the transmitter 1 and receiver 2.

In a modification of the invention it is possible to dispense with the separate control line 7 between the receiver 2 and the transmitter 1 by not demodulating the incoming signals in receiver 2 but instead feeding them back into the transmission line 3 at an intermediate radio frequency, for example 455 kHz, to be demodulated at the transmitter 1, which in this modification includes a conventional demodulator. At such intermediate frequency, transmission losses within the line 3 are not serious enough to require repeaters up to distances of 20 km or more and the signals may be arranged to pass through the higher-frequency repeaters in reverse direction without undue hindrance or effect.

Although in the above example the application of the invention has been described in relation to a tunnel in a coal mine, it is to be understood that the applications are far wider than this and are not limited in any way to underground uses. The invention will find application in any situation such as along a roadway or railway track where a transmission line can be strung along side the roadway or track and the mobile stations operate on the roadway or track. This is particularly advantageous where emergency services are concerned since communication is not limited to selected spots such as telephone boxes.

We claim:

1. A radio frequency communication system comprising a transmitter, a receiver, a radiating transmission line having a distal end connected to the receiver and having a proximal end connected to the transmitter, a unidirectional repeater in the radiating transmission line for repeating signals in a single direction only, and a mobile station adjacent the radiating transmission line, the mobile station including a mobile receiver to receive signals radiated from the transmission line and a mobile transmitter for transmitting signals to the transmission line, and a direct link line connecting the receiver with the transmitter whereby the link line provides a return path for demodulated signals in the audio frequency range.

2. A radio frequency communication system according to claim 1, the mobile transmitter operating at a different frequency to a frequency of the said transmitter.

3. A radio frequency communication system as claimed in claim 1, and including a branch line from the said transmission line, a separate local receiver terminating the branch line and a separate link line connecting the said local receiver with the transmitter.

4. A radio frequency communication system as claimed in claim 1 and including a plurality of branch transmission lines extending from the said transmission line, a respective local receiver for terminating each of said branch transmission lines and a common link line connecting all of the local receivers with the receiver of the said transmission line.

5. A radio frequency communication system as claimed in claim 1, and including a plurality of branch transmission lines extending from the said transmission line, a respective local receiver for terminating each of said branch transmission lines and a common link line connecting all of the local receivers with the said transmitter of the system.

* * * * *